(12) United States Patent
Qiu et al.

(10) Patent No.: US 7,342,080 B2
(45) Date of Patent: Mar. 11, 2008

(54) POLYMERIZABLE COMPOSITIONS, METHODS OF MAKING THE SAME, AND COMPOSITE ARTICLES THEREFROM

(75) Inventors: Zai-Ming Qiu, Woodbury, MN (US); Thomas P. Klun, Lakeland, MN (US); Naiyong Jing, Woodbury, MN (US); William D. Coggio, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/009,181

(22) Filed: Dec. 10, 2004

(65) Prior Publication Data

US 2005/0250921 A1     Nov. 10, 2005

Related U.S. Application Data (63) Continuation-in-part of application No. 10/841,792, filed on May 7, 2004, now abandoned.

(51) Int. Cl.
*C08F 116/12* (2006.01)

(52) U.S. Cl. ............ 526/247; 526/319; 525/337; 523/416

(58) Field of Classification Search ........... 526/247, 526/319; 525/339; 523/416
See application file for complete search history.

(56) References Cited

U.S. PATENT DOCUMENTS

| | | | |
|---|---|---|---|
| 3,242,218 A | 3/1966 | Miller | |
| 3,250,807 A | 5/1966 | Fritz et al. | |
| 3,250,808 A | 5/1966 | Moore et al. | |
| 3,274,239 A | 9/1966 | Selman | |
| 3,293,306 A | 12/1966 | Le Bleu et al. | |
| 3,322,826 A | 5/1967 | Moore | |
| 3,536,749 A | 10/1970 | Groves | |
| 3,544,537 A | 12/1970 | Brace | |
| 3,553,179 A | 1/1971 | Bartlett | |
| 3,766,251 A | 10/1973 | Caporiccio et al. | |
| 3,810,874 A | 5/1974 | Mitsch et al. | |
| 3,864,318 A | 2/1975 | Caporiccio et al. | |
| 4,085,137 A | 4/1978 | Mitsch et al. | |
| 4,094,911 A | 6/1978 | Mitsch et al. | |
| 4,256,560 A * | 3/1981 | Buchwalter et al. | 204/499 |
| 4,262,072 A | 4/1981 | Wendling et al. | |

(Continued)

FOREIGN PATENT DOCUMENTS

EP       0 622 353 A       11/1994

(Continued)

OTHER PUBLICATIONS

Shacklette et al., "Ultra-Low-Loss Polymers for Planar Photonic Applications Derived from Fluorinated Acrylate Monomers", Fluoropolymer 2002 Current Frontiers and Future Trends (2002), Preprint No. 7, 2 pages.

(Continued)

*Primary Examiner*—Peter D. Mulcahy
*Assistant Examiner*—Henry S. Hu
(74) *Attorney, Agent, or Firm*—Bradford B. Wright (57) ABSTRACT

Polymerizable fluorinated polyethers are formed by Michael-type addition of a reactive fluorinated polyether to a poly(meth)acryl compound. The polymerizable fluorinated polyethers may be used to form composite articles.

13 Claims, 1 Drawing Sheet

U.S. PATENT DOCUMENTS

| | | | |
|---|---|---|---|
| 4,321,404 A | 3/1982 | Williams et al. | |
| 4,440,918 A | 4/1984 | Rice et al. | |
| 4,472,480 A | 9/1984 | Olson | |
| 4,567,073 A | 1/1986 | Larson et al. | |
| 4,596,844 A * | 6/1986 | Ohsawa et al. | 523/417 |
| 4,614,667 A | 9/1986 | Larson et al. | |
| 4,647,413 A | 3/1987 | Savu | |
| 4,654,233 A | 3/1987 | Grant et al. | |
| 4,665,144 A | 5/1987 | Ohmori et al. | |
| 4,681,925 A | 7/1987 | Strepparola et al. | |
| 4,746,550 A | 5/1988 | Strepparola et al. | |
| 4,818,801 A | 4/1989 | Rice et al. | |
| 4,830,910 A | 5/1989 | Larson | |
| 4,853,097 A | 8/1989 | Marchionni et al. | |
| 4,855,184 A | 8/1989 | Klun et al. | |
| 4,873,140 A | 10/1989 | McIntyre | |
| 4,968,116 A | 11/1990 | Hulme-Lowe et al. | |
| 4,971,424 A | 11/1990 | Babirad et al. | |
| 5,002,978 A | 3/1991 | Goldenberg | |
| 5,021,501 A | 6/1991 | Ohmori et al. | |
| 5,057,585 A | 10/1991 | Agou et al. | |
| 5,059,700 A | 10/1991 | Marchionni et al. | |
| 5,076,844 A | 12/1991 | Fock et al. | |
| 5,239,026 A | 8/1993 | Babirad et al. | |
| 5,306,758 A | 4/1994 | Pellerite | |
| 5,326,823 A | 7/1994 | Rolando et al. | |
| 5,534,558 A | 7/1996 | Minns | |
| 5,623,037 A | 4/1997 | Simeone et al. | |
| 5,718,833 A | 2/1998 | Yamamoto et al. | |
| 5,822,489 A | 10/1998 | Hale | |
| 5,948,478 A | 9/1999 | Lenti et al. | |
| 5,962,611 A * | 10/1999 | Meijs et al. | 526/247 |
| 5,973,089 A | 10/1999 | Meijs et al. | |
| 6,127,498 A | 10/2000 | Tonelli et al. | |
| 6,160,148 A * | 12/2000 | Dauth et al. | 556/419 |
| 6,184,339 B1 | 2/2001 | Stansbury et al. | |
| 6,224,949 B1 | 5/2001 | Wright et al. | |
| 6,238,798 B1 | 5/2001 | Kang et al. | |
| 6,299,799 B1 | 10/2001 | Craig et al. | |
| 6,376,572 B1 | 4/2002 | Turri | |
| 6,383,633 B1 | 5/2002 | Allewaert et al. | |
| 6,395,822 B1 | 5/2002 | Edgington | |
| 6,403,760 B1 | 6/2002 | Weinert et al. | |
| 6,452,038 B1 | 9/2002 | Rao et al. | |
| 6,558,803 B1 * | 5/2003 | Malik | 428/447 |
| 6,660,388 B2 | 12/2003 | Liu et al. | |
| 6,660,389 B2 | 12/2003 | Liu et al. | |
| 6,664,345 B2 | 12/2003 | Savu et al. | |
| 2002/0115820 A1 | 8/2002 | Wang et al. | |
| 2003/0026997 A1 | 2/2003 | Qiu et al. | |
| 2003/0068486 A1 | 4/2003 | Arney et al. | |
| 2003/0226818 A1 | 12/2003 | Dunbar et al. | |
| 2004/0124396 A1 | 7/2004 | Flynn et al. | |
| 2005/0250928 A1 * | 11/2005 | Qiu et al. | 528/73 |

FOREIGN PATENT DOCUMENTS

| | | |
|---|---|---|
| EP | 0 851 246 A1 | 1/1998 |
| EP | 1 057 849 A2 | 6/2000 |
| EP | 1 227 076 A | 7/2002 |
| JP | 61-111308 | 5/1986 |
| JP | 3-39928 | 2/1991 |
| JP | 5-209030 | 8/1993 |
| JP | 6-40748 | 2/1994 |
| JP | 6-211945 | 8/1994 |
| JP | 2000-301053 | 4/1999 |
| JP | 2001-301053 | 10/2001 |
| JP | 2002-6102 | 1/2002 |
| WO | WO 02/02668 A | 1/2002 |
| WO | WO-02/02668 A2 * | 1/2002 |
| WO | WO-2002/002668 A2 * | 1/2002 |
| WO | WO 02/12404 A | 2/2002 |
| WO | WO 03/022906 A1 | 3/2003 |
| WO | WO 2004/002734 | 1/2004 |
| WO | WO-2005/113642 A1 * | 12/2005 |
| WO | WO-2005/113644 A1 * | 12/2005 |

OTHER PUBLICATIONS

Gelin et al., "Fluorniated Block Copolymers Containing Poly(vinylidene fluoride) or Poly(vinylidene fluoride-co-hexafluoropropylene) Blocks from Perfluropolyethers: Synthesis and Thermal Properties", Journal of Polymer Science: Part A: Polymer Chemistry, (2003), vol. 41, pp. 160-171.

Product Data Sheet: Solvay Solexis, "Fomblin Z Derivatives", Solvay Solexis, Inc. (2002), pp. 1-3.

Bongiovanni et al., "Perfluoropolyether Structures as Surface Modifying Agents of UV-curable Systems", Macromol. Chem. Phys. 199, (1998) pp. 1099-1105.

Bongiovanni et al., "U-V Curing of Fluorinated Systems: Synthesis and Properties", ACS Symposium Series 847, Photoinitiated Polymerization, American Chemical Society, (2003), Chapter 41, pp. 499-511.

Buckanin et al., "Coating Compositions with Reactive Fluorinated Copolymers Having Pendant Perfluoropolyether Groups", U.S. Appl. No. 10/738,185, filed Dec. 17, 2003.

Klun et al., "Polymerizable Compositions, Methods of Making the Same, and Composite Articles Therefrom", U.S. Appl. No. 10/841,792, filed May 7, 2004.

Coggio et al., "Article Comprising Fluorochemical Surface Layer", U.S. Appl. No. 10/841,159, filed May 7, 2004.

Qiu et al., "Fluorinated Polyether Polyamine and Method of Making the Same", U.S. Appl. No. 10/840,969, filed May 7, 2004.

Klun et al., "Polymerization Compositions, Methods of Making the Same, and Composite Articles Therefrom", U.S. Appl. No. 10/841,792. Filed May 7, 2004.

* cited by examiner

POLYMERIZABLE COMPOSITIONS, METHODS OF MAKING THE SAME, AND COMPOSITE ARTICLES THEREFROM

CROSS-REFERENCE TO RELATED APPLICATION

This application is a continuation-in-part of U.S. application Ser. No. 10/841,792, filed May 7, 2004 now abandoned.

BACKGROUND

Fluorinated polyethers (e.g., perfluoropolyethers) have useful properties that include low refractive index, soil resistance, lubricity, and high water repellency. Accordingly, fluorinated polyethers have been incorporated into various protective coatings to provide one or more of low refractive index, cleanability, durability, and scratch resistance.

Many fluorinated polyethers that have been incorporated in coatings tend to diffuse to the surface of the coatings and may become depleted over time, for example, by repeated cleaning of the surface of the protective coating.

Fluorinated polyethers having reactive groups have been incorporated in coatings to address the problem of diffusion, however many such methods are laborious and/or are not versatile.

There remains a continuing need for materials and methods that allow incorporation of fluorinated polyethers into protective coatings, such that the fluorinated polyethers are not prone to depletion over time.

SUMMARY

In one aspect, the present invention relates to a polymerizable composition comprising at least one compound described by the formula $$(F(R_fO)_xQZ^1R^1N^2CH_2CH_2C(=O)Z^2)_yM(Z^3C(=O)CR^3=CH_2)_z$$

or $$X[((R_fO)_xQZ^1R^1NR^2CH_2CH_2C(=O)Z^2)_yM(Z^3C(=O)CR^3=CH_2)_z]_b$$

wherein each $R_f$ independently represents a fluorinated alkylene group having from 1 to 6 carbon atoms;

each x independently represents an integer greater than or equal to 2;

each Q independently represents —$CF_2$—, —$CF(CF_3)$—, —$CF_2CF_2$—, —$CF_2CF_2CF_2$—, —$CF_2CF(CF_3)$—, —$CF(CF_3)CF_2$—, —$CF_2CF_2CH_2$—, —$CF_2CH_2$—, —$CF_2CF_2C(=O)$—, —$CF_2C(=O)$—, —$CF(CF_3)C(=O)$—, —$CF(CF_3)CH_2$—, an alkylene group having from 1 to 6 carbon atoms, or a heteroalkylene group having from 1 to 6 carbon atoms;

each $Z^1$, $Z^2$, and $Z^3$ independently represents —S—, —O—, —NH—, or —$NR^2$—;

each $R^1$ independently represents an alkylene, aralkylene, or heteroalkylene group;

each $R^2$ independently represents H, an alkyl group having from 1 to 6 carbon atoms, —$CH_2CH_2C(=O)Z^2M(Z^3C(=O)CR^3=CH_2)_z$, or —$R^1Z^1Q(OR_f)_xF$;

each $R^3$ independently represents H, F, or methyl;

each y and z independently represents an integer greater than or equal to 1;

each M represents a polyvalent organic group having a valence of y+z;

X represents a polyvalent organic group having a valence of b; and b represent an integer greater than or equal to 2.

In another aspect, the present invention relates to a polymerizable composition comprising at least one compound preparable by Michael-type addition of a reactive fluorinated polyether with a poly(meth)acryl compound.

In some embodiments, polymerizable compositions of the present invention further comprise at least one free-radically polymerizable monomer.

In yet another aspect, the present invention provides a method of making a polymerizable composition comprising combining:

a reactive fluorinated polyether; and a poly(meth)acryl compound under conditions sufficient to form a Michael-type adduct thereof, wherein the polymerizable compound has at least one acryl group.

Methods according to the present invention are typically relatively easy to carry fluorinated polyether moieties, for example, from commercially available starting materials.

In some embodiments, polymerizable compositions according to the present invention are coated on a substrate and at least partially polymerized to form a protective coating.

Accordingly, in another aspect, the present invention provides a composite article comprising a substrate having thereon an antisoiling composition preparable by at least partially polymerizing a polymerizable composition comprising at least one compound described by the formula $$(F(R_fO)_xQZ^1R^1NR^2CH_2CH_2C(=O)Z^2)_yM(Z^3C(=O)CR^3=CH_2)_z$$

or $$X[((R_fO)_xQZ^1R^1NR^2CH_2CH_2C(=O)Z^2)_yM(Z^3C(=O)CR^3=CH_2)_z]_b$$

wherein each $R_f$ independently represents a fluorinated alkylene group having from 1 to 6 carbon atoms;

each x independently represents an integer greater than or equal to 2;

each Q independently represents —$CF_2$—, —$CF(CF_3)$—, —$CF_2CF_2$—, —$CF_2CF_2CF_2$—, —$CF_2CF(CF_3)$—, —$CF(CF_3)CF_2$—, —$CF_2CF_2CH_2$—, —$CF_2CH_2$—, —$CF_2CF_2C(=O)$—, —$CF_2C(=O)$—, —$CF(CF_3)C(=O)$—, —$CF(CF_3)CH_2$—, an alkylene group having from 1 to 6 carbon atoms, or a heteroalkylene group having from 1 to 6 carbon atoms;

each $Z^1$, $Z^2$, and $Z^3$ independently represents —S—, —O—, —NH—, or —$NR^2$—;

each $R^1$ independently represents an alkylene, aralkylene, or heteroalkylene group;

each $R^2$ independently represents H, an alkyl group having from 1 to 6 carbon atoms, —$CH_2CH_2C(=O)Z^2M(Z^3C(=O)CR^3=CH_2)_z$, or —$R^1Z^1Q(OR_f)_xF$;

each $R^3$ independently represents H, F, or methyl;

each y and z independently represents an integer greater than or equal to 1;

each M represents a polyvalent organic group having a valence of y+z;

X represents a polyvalent organic group having a valence of b; and b represent an integer greater than or equal to 2.

In yet another aspect, the present invention provides a composite article comprising a substrate having on at least a portion thereof an antisoiling composition preparable by at least partially polymerizing a polymerizable composition, the polymerizable composition comprising a compound preparable by Michael-type addition of a reactive fluorinated polyether with a poly(meth)acryl compound.

In on embodiment, composite articles according to the present invention comprise an information display protector comprising a flexible membrane having opposed first and second surfaces, wherein an adhesive layer is supported on the first surface, wherein a hardcoat layer is supported on the second surface, and wherein a layer of the antisoiling composition is supported on the hardcoat layer.

By chemically incorporating a fluorinated polyether moiety into a polymeric protective coating, depletion of the fluorinated polyether from the protective coating over time, is generally reduced or eliminated.

Further, it is found that Michael-type addition products according to the present invention may be prepared that are compatible with common free-radically polymerizable monomers, enabling wide product formulation latitude.

As used herein:
the term "heteroalkylene group" includes both substituted and unsubstituted heteroalkylene groups;
the term "(meth)acryl" includes both acryl and methacryl groups;
the term "poly(meth)acryl compound" includes compounds having a plurality of (meth)acryl groups;
the term "reactive fluorinated polyether" refers to a fluorinated polyether having at least one —NH$_2$ or —NR$^2$H group, wherein R$^2$ is as defined herein above; and
the term "Michael-type addition" refers to an addition reaction as generally shown below:

wherein A and E represent monovalent residues.

DETAILED DESCRIPTION

Polymerizable compositions according to the present invention comprise at least one compound having one or more fluorinated polyether moieties bonded to one or more polymerizable(meth)acryl groups. Broadly, such compounds are generally preparable by Michael-type addition of a reactive fluorinated polyether to a compound having a plurality of (meth)acryl groups, of which plurality at least one is an acryl group.

There is a typically differential reactivity between acryl and methacryl groups with respect to Michael-type addition. Michael-type addition typically occurs easily with acryl groups (e.g., mere combination of a reactive fluorinated polyether with a compound having an acryl group, optionally with mild heating, typically, although not necessarily, results in spontaneous Michael-type addition), but may occur only with difficulty if at all, in the case of methacryl groups. For this reason, the poly(meth)acryl compound typically has at least one acryl group (e.g., as part of acryloxy or acrylamido functionality), although the poly (meth)acryl compound may also have additional (meth)acryl groups (e.g., as part of methacrylate or methacrylamido functionality).

Acid or base catalyst may be added to facilitate reaction of the reactive fluorinated polyether with the poly(meth) acryl compound. Useful acid catalysts include, for example, Lewis acids (e.g., AlCl$_3$, MgCl$_2$) and Bronsted acids. Useful base catalysts include, for example, non-nucleophilic tertiary amines (e.g., N,N,N',N'-tetramethyl-1,8-naphthalenediamine; 1,8-diazabicyclo[5.4.0]undec-7-ene; 1,5-diazabicyclo[4.3.0]non-5-ene).

Useful poly(meth)acryl compounds include, for example, (meth)acrylate monomers selected from the group consisting of (a) di(meth)acryl containing compounds such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated (10) bisphenol a diacrylate, ethoxylated (3) bisphenol a diacrylate, ethoxylated (30) bisphenol a diacrylate, ethoxylated (4) bisphenol a diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol diacrylate, tripropylene glycol diacrylate; (b) tri(meth)acryl containing compounds such as glycerol triacrylate, ethoxylated triacrylates (e.g., ethoxylated (3) trimethylolpropane triacrylate, ethoxylated (6) trimethylolpropane triacrylate, ethoxylated (9) trimethylolpropane triacrylate, ethoxylated (20) trimethylolpropane triacrylate), pentaerythritol triacrylate, propoxylated triacrylates (e.g., propoxylated (3) glyceryl triacrylate, propoxylated (5.5) glyceryl triacrylate, propoxylated (3) trimethylolpropane triacrylate, propoxylated (6) trimethylolpropane triacrylate), trimethylolpropane triacrylate, tris(2-hydroxyethyl)isocyanurate triacrylate; (c) higher functionality (meth)acryl containing compounds such as ditrimethylolpropane tetraacrylate, dipentaerythritol pentaacrylate, ethoxylated (4) pentaerythritol tetraacrylate, pentaerythritol tetraacrylate, caprolactone modified dipentaerythritol hexaacrylate; (d) oligomeric(meth)acryl compounds such as, for example, urethane acrylates, polyester acrylates, epoxy acrylates; polyacrylamide analogues of the foregoing; and combinations thereof. Such compounds are widely available from vendors such as, for example, Sartomer Company, Exton, Pa.; UCB Chemicals Corporation, Smyrna, Ga.; and Aldrich Chemical Company, Milwaukee, Wis. Additional useful (meth)acrylate materials include hydantoin moiety-containing poly(meth)acrylates, for example, as described in U.S. Pat. No. 4,262,072 (Wendling et al.).

Useful poly(meth)acryl compounds also include, for example, free-radically polymerizable (meth)acrylate oligomers and polymers having pendant (meth)acryl groups wherein at least one of the (meth)acryl groups is an acryl group.

Useful (meth)acrylate oligomers include (meth)acrylated polyether and polyester oligomers. Examples of useful acrylated polyether oligomers include polyethylene glycol diacrylates available, for example, under the trade designations "SR259" and "SR344" from Sartomer Company. Acrylated polyester oligomers are available, for example, under the trade designations "EBECRYL 657" and "EBECRYL 830" from UCB Chemicals Corporation.

Other useful (meth)acrylate oligomers include (meth)acrylated epoxies, for example, diacrylated esters of epoxy-functional materials (e.g., diacrylated esters of bisphenol A epoxy-functional material) and (meth)acrylated urethanes. Useful (meth)acrylated epoxies include, for example, acrylated epoxies available under the trade designations "EBECRYL 3500", "EBECRYL 3600", "EBECRYL 3700", and "EBECRYL 3720" from UCB Chemicals Corporation. Useful (meth)acrylated urethanes include, for example, acrylated urethanes available under the trade designations "EBECRYL 270", "EBECRYL 1290", "EBECRYL 8301", and "EBECRYL 8804" from UCB Chemicals Corporation.

In one embodiment of the present invention, the Michael-type addition compounds are described by the formula $(F(R_fO)_xQZ^1R^1NR^2CH_2CH_2C(=O)Z^2)_yM(Z^3C(=O)CR^3=CH_2)_z$ or $X[((R_fO)_xQZ^1R^1NR^2CH_2CH_2C(=O)Z^2)_yM(Z^3C(=O)CR^3=CH_2)_z]_b$ Each $R_f$ independently represents a fluorinated alkylene group having from 1 to 6 carbon atoms. For example, $R_f$ may be a partially fluorinated group such as $-CF_2CF_2CH_2-$, $-CH_2CF_2CH_2-$, or a perfluorinated alkylene group having from 1 to 6 carbon atoms such as $-CF_2-$, $-CF(CF_3)-$, $-CF_2CF_2-$, $-CF_2CF_2CF_2-$, $-CF(CF_3)CF_2-$, $-CF_2CF(CF_3)-$ or $-(CF_2)_6-$. Since each $R_f$ is independently selected, $-(R_fO)_x-$ may thus represent, for example, $-(CF(CF_3)CF_2O)_8-$, $-(CF_2CF_2O)_3(CF(CF_3)CF_2O)_{12}-$, $-(CF_2CF_2O)_2(CF(CF_3)CF_2O)_{98}(CF_2CF_2O)-$, etc.

Each x independently represents an integer greater than or equal to 2. For example, x may be greater than 3 or greater than 4.

Each Q independently represents $-CF_2-$, $-CF(CF_3)-$, $-CF_2CF_2-$, $-CF_2CF_2CF_2-$, $-CF_2CF(CF_3)-$, $-CF(CF_3)CF_2-$, $-CF_2CF_2CH_2-$, $-CF_2CH_2-$, $-CF_2CF_2C(=O)-$, $-CF_2C(=O)-$, $-CF(CF_3)C(=O)-$, $-CF(CF_3)CH_2-$, an alkylene group having from 1 to 6 carbon atoms, or a heteroalkylene group having from 1 to 6 carbon atoms.

Each of $Z^1$, $Z^2$, and $Z^3$ independently represents $-S-$, $-O-$, $-NH-$, or $-NR^2-$.

Each $R^1$ independently represents an alkylene, aralkylene, or heteroalkylene group. For example, each $R^1$ may represent an alkylene, aralkylene or heteroalkylene group having from 1 or 2 carbon atoms up to 6, 8, 10, 12, or even 18 carbon atoms, and may have at least 1, 2, 3, or 4 catenary optionally-substituted heteroatoms (e.g., $-O-$, $-S-$, $-NH-$, $-N(R^2)-$). Examples include:
$-CH_2CH_2OCH_2CH_2OCH_2CH_2-$,
$-CH_2NHCH_2CH_2NHCH_2-$,
$-CH_2CH_2NHCH_2CH_2NHCH_2CH_2-$,
$-CH_2CH_2NHCH_2CH_2N(CH_2CH_3)CH_2CH_2-$,
$-CH_2CH_2CH_2-$, $-CH_2CH_2-$, and $-CH_2-$.

Each $R^2$ independently represents H, an alkyl group having from 1 to 6 carbon atoms, $-CH_2CH_2C(=O)Z^2M(Z^3C(=O)CR^3=CH_2)_z$, or $-R^1Z^1Q(OR_f)_xF$.

Each $R^3$ independently represents H, F, or methyl.

Each y and z independently represents an integer greater than or equal to 1. For example, y and/or z may be 1, 2, or 3.

Each M independently represents a polyvalent organic group having a valence of y+z. In one embodiment, M may be a polyvalent organic group having a valence of at least 3. Examples of polyvalent groups M include 2,2-bis(ylomethyl)butan-1-yl; ethylene; 2,2-bis(ylomethyl)-propan-1,3-diyl; and 2,2,6,6-tetrakis(ylomethyl)-4-oxaheptan-1,7-diyl; [[2,2,6,6-tetrakis(ylomethyl)-4-oxaheptan-1,7-diyl]]; butan-1,3-diyl; hexan-1,6-diyl [[hexane-1,6-diyl ]]; and 1,4-bis(ylomethyl)cyclohexane.

Each X independently represents a polyvalent organic group having a valence of b, and b represents an integer greater than or equal to 2. For example, X may be a perfluoroalkylenedioxy group comprising at least 3 perfluoroalkyleneoxy groups.

Each b independently represents an integer greater than or equal to 2.

Reactive fluorinated polyethers may be prepared, for example, by reaction of the corresponding fluorinated polyether ester (including fluorinated polyether multi-esters) or the corresponding fluorinated polyether acid halide (including fluorinated polyether multi-acid halides), typically an acid fluoride, with a nucleophilic compound such as, for example, an alkylenediamine which are either diprimary, disecondary, or mixed primary and secondary diamines, and higher polyamines (e.g., triethylenetetramine). In such cases, the stoichiometry should typically be adjusted such that the resultant reactive fluorinated polyether adduct has, on average, at least one nucleophilic group per molecule of reactive fluorinated polyether.

Accordingly, in one embodiment, useful reactive fluorinated polyethers are described by the formula $F(R_fO)_xQZ^1R^1NR^2H$ or $X(R_fO)_xQZ^1R^1NR^2H$ wherein $R_f$, x, Q, $Z^1$, $R^1$, $R^2$, and X are as previously defined hereinabove.

In one embodiment, polymerizable compositions according to the present invention may be prepared from reactive fluorinated polyethers by Michael-type addition to multifunctional acrylates, with or without the aid of a catalyst.

In another embodiment, polymerizable compositions according to the present invention may be prepared by reaction of a fluorinated polyether acid halide and a pre-formed Michael-type adduct having a polymerizable moiety and a free hydroxyl group such as, for example, the material obtained by reaction of an amino alcohol (e.g., N-methylethanolamine) with a polyacrylate (e.g., trimethylolpropane triacrylate).

It will be evident to one skilled in the art that a mixture of reactive fluorinated polyethers may be used to prepare polymerizable compositions according to the present invention. Similarly, it will be evident to one skilled in the art that polymerizable compositions according to the present invention will typically be prepared as a mixture (e.g., a statistical mixture) of adducts, which may be used "as is" or further purified, for example, using conventional methods.

Further details concerning the materials and procedures for the preparation of reactive fluorinated polyethers can be found in, for example, U.S. Pat. No. 3,242,218 (Miller); U.S. Pat. No. 3,322,826 (Moore); U.S. Pat. No. 3,250,808 (Moore et al.); U.S. Pat. No. 3,274,239 (Selman); U.S. Pat. No. 3,293,306 (Le Bleu et al.); U.S. Pat. No. 3,810,874 (Mitsch et al.); U.S. Pat. No. 3,544,537 (Brace); U.S. Pat. No. 3,553,179 (Bartlett); U.S. Pat. No. 3,864,318 (Caporiccio et al.); U.S. Pat. No. 4,321,404 (Williams et al.), U.S. Pat. No. 4,647,413 (Savu); U.S. Pat. No. 4,818,801 (Rice et al.); U.S. Pat. No. 4,472,480 (Olson); U.S. Pat. No. 4,567,073 (Larson et al.); U.S. Pat. No. 4,830,910 (Larson); and U.S. Pat. No. 5,306,758 (Pellerite), the disclosures of which are incorporated herein by reference.

Polymerizable compositions according to the present invention may further comprise at least one additional free-radically polymerizable monomer. In addition to the poly(meth)acryl compound monomers, oligomers, and polymers previously mentioned, useful free-radically polymerizable monomers include, for example, styrene and substituted styrenes (e.g., 1,4-divinylbenzene, alpha-methylstyrene); vinyl esters (e.g., vinyl acetate); vinyl ethers (e.g., butyl vinyl ether); N-vinyl compounds (e.g., N-vinyl-2-pyrrolidone, N-vinylcaprolactam); acrylamide and substituted acrylamides (e.g., N,N-dialkylacrylamide); monofunctional(meth)acrylates (e.g., isooctyl(meth)acrylate, nonylphenol ethoxylate(meth)acrylate, isononyl(meth)acrylate, diethylene glycol(meth)acrylate, isobornyl(meth)acrylate, 2-(2-ethoxyethoxy)ethyl(meth)acrylate, 2-ethylhexyl (meth)acrylate, lauryl(meth)acrylate, butanediol mono (meth)acrylate, beta-carboxyethyl(meth)acrylate, isobutyl (meth)acrylate, 2-hydroxyethyl(meth)acrylate, (meth) acrylonitrile, maleic anhydride, itaconic acid, isodecyl (meth)acrylate, dodecyl(meth)acrylate, n-butyl(meth) acrylate, methyl(meth)acrylate, hexyl(meth)acrylate, (meth) acrylic acid, stearyl(meth)acrylate, hydroxy functional polycaprolactone ester(meth)acrylate, hydroxypropyl(meth) acrylate, hydroxyisopropyl(meth)acrylate, hydroxybutyl (meth)acrylate, tetrahydrofurfuryl(meth)acrylate, cyclohexyl(meth)acrylate, n-hexyl(meth)acrylate, 2-ethoxyethyl (meth)acrylate, isodecyl(meth)acrylate, 2-methoxyethyl (meth)acrylate, 2-(2-ethoxyethoxy)ethyl(meth)acrylate, lauryl(meth)acrylate, 2-phenoxyethyl(meth)acrylate, isocyanatoethyl(meth)acrylate, glycidyl(meth)acrylate, benzyl (meth)acrylate, tridecyl(meth)acrylate, caprolactone(meth) acrylate, hydroxyisobutyl(meth)acrylate, and tetrahydrofurfuryl(meth)acrylate); and combinations thereof. Such compounds are widely available from vendors such as, for example, Sartomer Company, Exton, Pa.; UCB Chemicals Corporation, Smyrna, Ga.; and Aldrich Chemical Company, Milwaukee, Wis.

Polymerizable compositions according to the present invention may also include additional polymerizable materials such as, for example, epoxy resin(s), polyisocyanates, and phenolic resins.

Fluorinated (meth)acrylate compounds may also be included in polymerizable compositions of the present invention. Examples of suitable fluorinated (meth)acrylate compounds include 1H,1H-2,2,3,3,4,4,4-heptafluorobutyl acrylate, available from Sigma-Aldrich, Saint Louis, Mo.; 1H,1H,2H,2H-perfluorodecyl acrylate and/or ω-hydro-2,2,3,3,4,4,5,5-octafluoropentyl acrylate, both available from Lancaster Synthesis, Windham, N.H.; $C_4F_9SO_2N(CH_3)CH_2CH_2C(=O)CH=CH_2$ made by the procedure of Examples 2A and 2B of U.S. Pat. No. 6,664,354 (Savu et al.); and fluorinated (meth)acryl compounds mentioned in U.S. Pat. No. 4,968,116 (Hulme-Lowe et al.) and U.S. Pat. No. 5,239,026 (Babirad et al.), including (perfluorocyclohexyl)methyl acrylate.

Any amount of the Michael-type addition product may be present in the polymerizable composition. For example, in those applications in which cleanability, durability, and scratch resistance are desirable, the amount of the Michael-type addition product may be less than or equal to 20 percent by weight, for example, less than or equal to 10 percent by weight or even less than or equal to 5 percent by weight, based on the total weight of the polymerizable composition. In applications in which a low refractive index is desirable, the amount of Michael-type addition product in the polymerizable composition may be at least 50, 60, 70, or even 80 percent by weight, up to at least 95 percent by weight.

To facilitate curing, polymerizable compositions according to the present invention may further comprise at least one free-radical thermal initiator and/or photoinitiator. Typically, if such an initiator and/or photoinitiator is present, it comprises less than about 10 percent by weight, more typically less than about 5 percent of the polymerizable composition, based on the total weight of the polymerizable composition. Free-radical curing techniques are well known in the art and include, for example, thermal curing methods as well as radiation curing methods such as electron beam or ultraviolet radiation. Further details concerning free radical thermal and photopolymerization techniques may be found in, for example, U.S. Pat. No. 4,654,233 (Grant et al.); U.S. Pat. No. 4,855,184 (Klun et al.); and U.S. Pat. No. 6,224,949 (Wright et al.). Further, sensitizers such as 2-isopropylthioxanthone, commercially available from First Chemical Corporation, Pascagoula, Miss., may be used in conjunction with photoinitiator(s) such as, for example, "IRGACURE 369".

Useful free-radical thermal initiators include, for example, azo, peroxide, persulfate, and redox initiators, and combinations thereof.

Suitable azo initiators include, for example, 2,2'-azobis (4-methoxy-2,4-dimethylvaleronitrile) (available under the trade designation "VAZO 33"), 2,2'-azobis(2-amidinopropane)dihydrochloride (available under the trade designation "VAZO 50"), 2,2-azobis(2,4-dimethylvaleronitrile) (available under the trade designation "VAZO 52"), 2,2'-azobis (isobutyronitrile) (available under the trade designation "VAZO 64"), 2,2'-azobis-2-methylbutyronitrile (available under the trade designation "VAZO 67"), and 1,1'-azobis(1-cyclohexanecarbonitrile) (available under the trade designation "VAZO 88"), all of which are available from E.I. du Pont de Nemours and Company, Wilmington, Del.; and 2,2'-azobis(methyl isobutyrate) (available under the trade designation "V-601" from Wako Pure Chemical Industries, Ltd., Osaka, Japan).

Suitable peroxide initiators include, for example, benzoyl peroxide, acetyl peroxide, lauroyl peroxide, decanoyl peroxide, dicetyl peroxydicarbonate, di(4-t-butylcyclohexyl) peroxydicarbonate (available under the trade designation "PERKADOX 16", from Akzo Chemicals, Chicago, Ill.), di(2-ethylhexyl)peroxydicarbonate, t-butylperoxypivalate (available under the trade designation "LUPERSOL 11", from Lucidol Division, Atochem North America, Buffalo, N.Y.); t-butylperoxy-2-ethylhexanoate (available under the trade designation "TRIGONOX 21-C50" from Akzo Chemicals), and dicumyl peroxide.

Suitable persulfate initiators include, for example, potassium persulfate, sodium persulfate, and ammonium persulfate.

Suitable redox (oxidation-reduction) initiators include, for example, combinations of persulfate initiators with reducing agents including, for example, sodium metabisulfite and sodium bisulfite; systems based on organic peroxides and tertiary amines (e.g., benzoyl peroxide plus dimethylaniline); and systems based on organic hydroperoxides and transition metals (e.g., cumene hydroperoxide plus cobalt naphthenate).

Useful free-radical photoinitiators include, for example, those known as useful in the UV cure of acrylate polymers. Such initiators include benzophenone and its derivatives (including acrylated benzophenones); benzoin, alpha-methylbenzoin, alpha-phenylbenzoin, alpha-allylbenzoin, alpha-benzylbenzoin; benzoin ethers such as benzil dimethyl ketal (commercially available under the trade designation "IRGACURE 651" from Ciba Specialty Chemicals Corporation of Tarrytown, N.Y.), benzoin methyl ether, benzoin ethyl ether, benzoin n-butyl ether; acetophenone and its derivatives such as 2-hydroxy-2-methyl-1-phenyl-1-propanone (commercially available under the trade designation "DAROCUR 1173" from Ciba Specialty Chemicals Corporation) and 1-hydroxycyclohexyl phenyl ketone (commercially available under the trade designation "IRGACURE 184", also from Ciba Specialty Chemicals Corporation); 2-methyl-1-[4-(methylthio)phenyl]-2-(4-morpholinyl)-1-propanone commercially available under the trade designation "IRGACURE 907", also from Ciba Specialty Chemicals Corporation); 2-benzyl-2-(dimethlamino)-1-[4-(4-morpholinyl)phenyl]-1-butanone commercially available under the trade designation "IRGACURE 369" from Ciba Specialty Chemicals Corporation); aromatic ketones such as benzophenone and its derivatives and anthraquinone and it derivatives; onium salts such as diazonium salts, iodonium salts, sulfonium salts; titanium complexes such as, for example, that which is commercially available under the trade designation "CGI 784 DC", also from Ciba Specialty Chemicals Corporation); uranyl salts; halomethylnitrobenzenes; and mono- and bis-acylphosphines such as those available from Ciba Specialty Chemicals Corporation under the trade designations "IRGACURE 1700", "IRGACURE 1800", "IRGACURE 1850", "IRGACURE 819" "IRGACURE 2005", "IRGACURE 2010", "IRGACURE 2020" and "DAROCUR 4265". Combinations of two or more photoinitiators may be used, for example, to simultaneously achieve good surface and through curing.

Polymerizable compositions according to the present invention may, optionally, contain one or more additional ingredients such as, for example, antioxidants, light stabilizers, filler, fragrance, colorants, antistatic agents, inorganic nanoparticles, and/or solvents.

Figure 1:
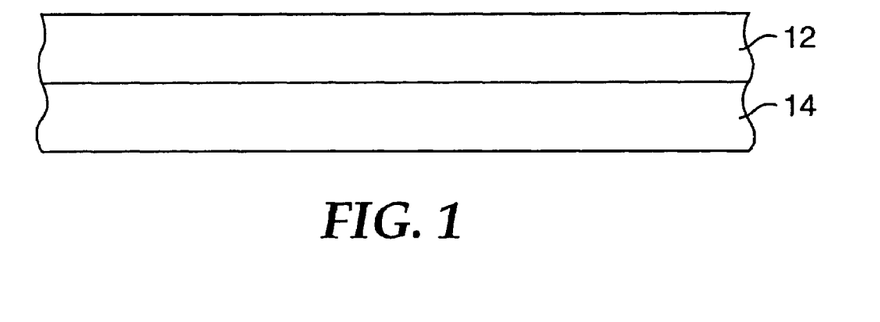
FIG. 1 is a schematic side view of a composite article according to one exemplary embodiment of the present invention.

Polymerizable compositions according to the present invention may be coated on a substrate and at least partially cured to provide a composite article, for example, as shown in FIG. 1. Referring now to FIG. 1, exemplary composite article 10 comprises substrate 14 having at least partially polymerized polymerizable coating 12 disposed thereon. In some embodiments, the polymerized coating may form a protective coating that provides at least one of mar resistance, graffiti resistance, stain resistance, adhesive release, low refractive index, and water repellency.

Suitable substrates include, for example, glass (e.g., windows and optical elements such as, for example, lenses and mirrors), ceramic (e.g., ceramic tile), cement, stone, painted surfaces (e.g., automobile body panels, boat surfaces), metal (e.g., architectural columns), paper (e.g., adhesive release liners), cardboard (e.g., food containers), thermosets, thermoplastics (e.g., polycarbonate, acrylics, polyolefins, polyurethanes, polyesters, polyamides, polyimides, phenolic resins, cellulose diacetate, cellulose triacetate, polystyrene, and styrene-acrylonitrile copolymers), and combinations thereof. The substrate may be a film, sheet, or it may have some other form. The substrate may comprise a transparent or translucent display element, optionally having a ceramer hardcoat thereon.

The polymerizable composition may be applied to the substrate by conventional techniques such as, for example, spraying, knife coating, notch coating, reverse roll coating, gravure coating, dip coating, bar coating, flood coating, or spin coating. Typically, the polymerizable composition is applied to the substrate as a relatively thin layer resulting in a dried cured layer having a thickness in a range of from about 40 nm to about 60 nm, although thinner and thicker (e.g., having a thickness up to 100 micrometers or more) layers may also be used. Next, any optional solvent is typically at least partially removed (e.g., using a forced air oven), and the polymerizable composition is then at least partially polymerized (i.e., cured) to form a durable coating, for example, as described hereinabove.

Composite articles according to the present invention include, for example, eyeglass lenses, mirrors, windows, adhesive release liners, and anti-graffiti films.

Figure 2:
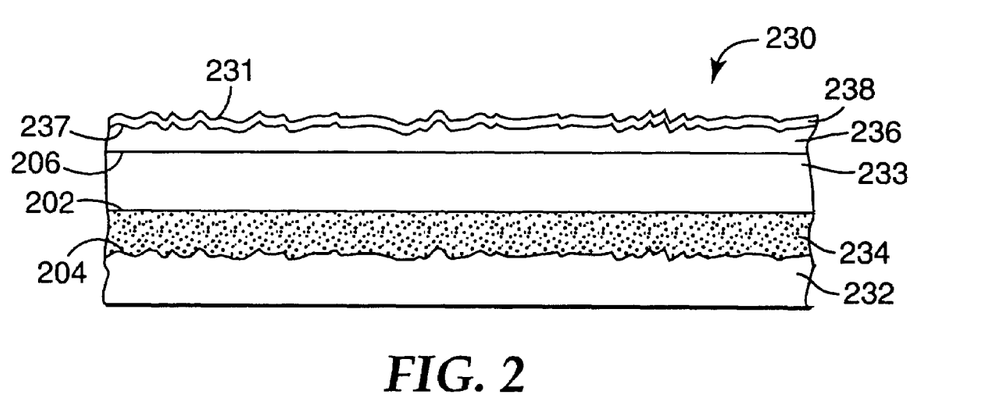
FIG. 2 is a schematic side view of an information display protector according to one exemplary embodiment of the present invention.

In addition, composite articles according to the present invention may comprise an information display protector. By way of illustration, FIG. 2 shows an exemplary information display protector generally identified as 230. The first major surface 202 of flexible transparent film 233 supports adhesive layer 234 to which contacts optional protective liner 232. Outer surface 204 of adhesive 234 may optionally be microtextured, for example, as depicted. Microtexturing typically helps air bubbles escape from beneath information display protector 230 when it is applied to a display screen, thereby helping to provide good optical coupling between information display protector 230 and a display screen (not shown). Hardcoat layer 236 is supported on second major surface 206 of film 233. Hardcoat layer 236 optionally has a roughened outward surface 237, for example, as depicted, which in use provides glare protection for the display screen to which information display protector 230 is adhered, and makes it easier to write upon information display protector 230 using a stylus. Antisoiling coating composition 238 according to the present invention is supported on upper surface 237 of hardcoat 236, and is typically sufficiently thin so that the roughened upper surface 237 of hardcoat 236 is replicated on viewing surface 231.

Further details concerning ceramer hardcoats, substrates and display elements may be found in for example, U.S. Pat. No. 6,660,389 (Liu et al.) and U.S. Pat. Publ. 2003/0068486 (Arney et al.), the disclosures of which are incorporated herein by reference.

Objects and advantages of this invention are further illustrated by the following non-limiting examples, but the particular materials and amounts thereof recited in these examples, as well as other conditions and, details, should not be construed to unduly limit this invention.

EXAMPLES

In the examples, all parts, percentages, ratios, etc. in the examples and the rest of the specification are by weight, unless noted otherwise. Further, unless otherwise noted, all reagents used in the examples were obtained, or are available, from general chemical suppliers such as, for example, Sigma-Aldrich Company, Saint Louis, Mo., or may be synthesized by conventional methods.

The following abbreviations are used throughout the examples:

| ABBREVIATION | COMPOUND |
| --- | --- |
| FC-1 | $F(CF(CF_3)CF_2O)_aCF(CF_3)C(=O)OCH_3$, wherein a averages about 6.3, with an average molecular weight of 1,211 g/mol, and which can be prepared according to the method reported in U.S. Pat. No. 3,250,808 (Moore et al.), the disclosure of which is incorporated herein by reference, with purification by fractional distillation. |
| FC-2 | believed to have the formula $CH_3O_2C(OCF_2CF_2)_p[OCF_2CF(CF_3)]_q(OCF_2)_rCO_2CH_3$, average molecular weight of about 2,000 g/mol, available from Ausimont, USA, Thorofare, New Jersey under the trade designation "FOMBLIN Z-DEAL" |
| FC-3 | $F(CF(CF_3)CF_2O)_aCF(CF_3)C(=O)F$, wherein a averages about 5.7, with an average molecular weight of 1,115 g/mol, and which can be prepared according to the method reported in U.S. Pat. No. 3,250,808 (Moore et al.), with purification by fractional distillation. |
| FC-4 | $F(CF(CF_3)CF_2O)_aCF(CF_3)C(=O)NHCH_2CH_2OC(=O)CH=CH_2$ was prepared as follows:<br>50.0 g of oligomeric hexafluoropropyleneoxide methyl ester FC-1 was placed in 200 mL round bottom flask. The flask was purged with nitrogen and placed in a water bath to maintain a temperature of 50° C. or less. To this flask was added 3.0 g (0.045 mol) of 2-aminoethanol. The reaction mixture was stirred for about 1 hr, after which time an infrared spectrum of the reaction mixture showed complete loss of the methyl ester band at 1790 cm$^{-1}$ and the presence of the strong amide carbonyl stretch at 1710 cm$^{-1}$. Methyl t-butyl ether (200 mL) was added to the reaction mixture and the organic phase was washed twice with 5 percent by weight aqueous HCl to remove unreacted amine and methanol. The organic phase layers were combined and dried over anhydrous MgSO$_4$. The methyl t-butyl ether was removed under reduced pressure (first using an aspirator, then using 0.1 mm Hg vacuum) to yield HFPOC(=O)NHCH$_2$CH$_2$OH as a clear, viscous liquid.<br>To a 3-necked round-bottom flask equipped with overhead stirrer was charged 200 g (0.1468 mol) HFPOC(=O)NHCH$_2$CH$_2$OH, 18.07 g (0.1786 mol) of triethylamine, 8 mg of 4-methoxylphenol, and 200 g of ethyl acetate. Next, at room temperature, 16.16 g (0.1786 mol) of acryloyl chloride was added to the flask over 30 minutes. The reaction was stirred for about 2.75 hours, and then washed successively with 1 weight percent aqueous sulfuric acid, 1 weight percent aqueous sodium bicarbonate, and water. The resultant product was purified by chromatography on silica gel (grade 62, 60–200 mesh), obtained under the trade designation "SX0143U-3" from EM Science, Darmstadt, Germany using 35/65 ethyl acetate/heptane (by volume) as the eluent. |
| FC-5 | ω-hydro-2,2,3,3,4,4,5,5-octafluoropentyl acrylate (H—C$_4$F$_8$-CH$_2$OC(=O)CH=CH$_2$) was obtained from Oakwood Products, West Columbia, South Carolina |
| AM-1 | N-methyl-1,3-propanediamine |
| AM-2 | N-ethyl-1,2-ethanediamine |
| AM-3 | 2-(2-aminoethylamino)ethanol |
| AM-4 | pentaethylenehexaamine |
| AM-5 | ethylenediamine |
| AM-6 | N-methylethanolamine |
| AM-7 | 1,3-propanediamine |
| AC-1 | trimethylolpropane triacrylate, obtained under the trade designation "SR351" from Sartomer Company, Exton, Pennsylvania, nominal molecular weight = 296 g/mol. |
| AC-2 | pentaerythritol triacrylate, obtained under the trade designation "SR444" from Sartomer Company, nominal molecular weight = 298 g/mol |
| AC-3 | dipentaerythritol pentaacrylate, obtained under the trade designation "SR399LV" from Sartomer Company, nominal molecular weight = 508 g/mol |
| AC-4 | ethoxylated (3) trimethylolpropane triacrylate, obtained under the trade designation "SR454" from Sartomer Company, nominal molecular weight = 428 g/mol |
| AC-5 | ethoxylated (4) pentaerythritol tetraacrylate, obtained under the trade designation "SR494" from Sartomer Company, nominal molecular weight = 526 g/mol |

-continued

| ABBREVIATION | COMPOUND |
|---|---|
| AC-6 | 1,4-butanediol diacrylate, obtained under the trade designation "SR213" from Sartomer Company, nominal molecular weight = 198 g/mol |
| PI-1 | Photoinitiator, 2-hydroxy-2-methyl-1-phenylpropane-1-one, available under the trade designation "DAROCUR 1173" from Ciba Specialty Chemicals Corporation, Tarrytown, New York |
| PI-2 | Photoinitiator, benzil dimethylketal, obtained under the trade designation "ESACURE KB-1" from Sartomer Company |
| FS | $C_4F_9OCH_3$, available under the trade designation "3M NOVEC ENGINEERED FLUID HFE-7100" from 3M Company |
| HFPO- | $F(CF(CF_3)CF_2O)_aCF(CF_3)$-, where a is about 6.3 |
| S1 | a transparent polyethylene terephthalate film obtained from E.I. du Pont de Nemours and Company, Wilmington, Delaware under the trade designation "MELINEX 618" having a thickness of 5.0 mils (0.1 mm) and a primed surface. A hardcoat composition that was substantially the same as that described in Example 3 of U.S. Pat. No. 6,299,799 ((Craig et al.) was coated onto the primed surface and cured (nominal cured film thickness was 5 micrometers). |
| S2 | a matte film having a hardcoat surface layer available under the trade designation " "N4D2A" from U.S.A. Kimoto Tech, Cedartown, Georgia |

Further, as used hereinbelow: mm=millimeters, g=grams, mg=milligrams, mol=mole, mmol=millimole, meq=milliequivalents, and mL=milliliters.

In Table 2, "NM" means not measured.

Cheese Cloth Abrasion Resistance Test

A specimen to be tested (S1 substrates: 30.5 cm×22.9 cm; S2 substrates 30.5 cm×15.2 cm) is mounted in a mechanical device capable of oscillating a cheesecloth at a rate of 35 cm/second, which cheesecloth is folded into twelve layers and fastened to a stylus by a rubber gasket. The specimen is mounted such that the cheesecloth travels in a direction orthogonal to the coating direction of the specimen. The stylus had a flat, cylindrical to which different weights were attached to increase the force exerted by the stylus normal to the film's surface. The cheesecloth was obtained from Summers Optical, EMS Packaging, a subdivision of EMS Acquisition Corp., Hatsfield, Pa. under the trade designation "MIL SPEC CCC-C-440 PRODUCT # S12905". A "wipe" is defined as a single travel of 10 cm. For each specimen, the weight in grams applied to the stylus and number of wipes employed for testing condition is reported.

An ink marking is applied to the surface coating of the specimen with a felt marker commercially available under the trade designation "SANFORD SHARPIE, FINE POINT PERMANENT MARKER, NO. 30001". The ink marking is observed and a determination is made as to whether the ink marking beads up when applied to the surface ("yes") or does not bead up ("no").

The ink marking is wiped with a tissue, using moderate hand pressure, using a tissue available from Kimberly Clark Corporation, Roswell, Ga. under the trade designation "SURPASS FACIAL TISSUE". The ink marking is observed and a determination is made as to whether the ink marking is removed by wiping with the tissue ("yes" or "no").

The surface performance is noted after 50, 100, 150, 200, 300, and 500 wipes.

Contact Angle Measurement Procedure

Samples of coated films with approximate dimensions of 2.5 cm×4 cm are cut and mounted on standard glass microscope slides using double-stick adhesive tape. Contact angle measurements are made using as-received reagent-grade hexadecane (Aldrich Chemical Company, Milwaukee, Wis.) and deionized water filtered through a filtration system "MIILI-Q" available from Millipore Corporation (Billerica, Mass.) and a video contact angle analyzer available under the trade designation "VCA-2500XE" from AST Products (Billerica, Mass.). Reported values are the averages of measurements on at least three drops measured on opposed sides of each drop. Drop volumes are 5 microliters for static measurements and 1-3 microliters for advancing and receding measurements.

Coating Method 1

The polymerizable composition is coated onto substrate S1 or S2 using a syringe pump to meter the solution into the die to provide a dry thickness of 40-60 nanometers (nm). Solvent is removed in a conventional air flotation oven with heating at 65° C. and then sent at a line speed 3 meters per minute through a cure chamber having less than 50 parts per million (ppm) oxygen and containing a 600-Watt H-type bulb from Fusion UV Systems, Gaithersburg, Md., operating at full power.

Coating Method 2

The polymerizable composition is coated onto substrate S1 or S2 using a coating block at 127 micrometers wet thickness. Solvent is removed in an oven operating at a temperature of 120° C. for 10 min. Next, the coating was cured under nitrogen at a line speed 35 feet/minute (11 meters/minute) using a 600-Watt (600 joules/second) "D-type" bulb operating at full power, available from Fusion UV Systems, Gaithersburg, Md.

Preparation of $HFPOC(=O)NHCH_2CH_2CH_2NHCH_3$ (FC-1/AM-1)

A 1-liter round-bottom flask was charged with 291.24 g (0.2405 mol) of FC-1 and 21.2 g (0.2405 mol) AM-1, both at room temperature, resulting in a cloudy solution. The flask was swirled and the temperature of the mixture rose to 45° C., and to give a water-white liquid, which was heated overnight at 55° C. The product was then placed on a rotary evaporator at 75° C. and 28 inches of Hg vacuum to remove methanol, yielding 301.88 g of a viscous slightly yellow liquid (i.e., FC-1/AM-1), nominal molecular weight=1267.15 g/mol.

Preparation of HFPOC(=O)NHCH$_2$CH$_2$NHCH$_2$CH$_3$ (FC-1/AM-2)

According to the procedure for preparing FC-1/AM-1, but substituting AM-2 for AM-1, 50 g (41.29 mmol) of FC-1 was combined with 3.64 g (41.29 mmol) of AM-2 to provide FC-1/AM-2, nominal molecular weight=1267.15 g/mol.

Preparation of HFPOC(=O)NHCH$_2$CH$_2$NHCH$_2$CH$_2$OH (FC-1/AM-3)

According to the procedure for preparing FC-1/AM-1, but substituting AM-3 for AM-1, 300 g (0.2477 mol) of FC-1 and 25.8 g (0.2477 mol) of AM-3 were reacted to provide 312.0 g of FC-1/AM-3, nominal molecular weight=1283.15 g/mol.

Preparation of HFPOC(=O)NH(CH$_2$CH$_2$NH)$_4$CH$_2$CH$_2$NHC(=O)HFPO (FC-1/AM-4)

According to the procedure for preparing FC-1/AM-1, but substituting AM-4 for AM-1, 50 g (41.29 mmol) of FC-1 was combined with 4.80 g (20.64 mmol) of AM-4 and concentrated to provide FC-1/AM-4, nominal molecular weight 2590.4, nominal equivalent weight=647.6 g/mol.

Preparation of HFPOC(O)N(H)CH$_2$CH$_2$NH$_2$ (FC-1/AM-5)

To a 100-mL round-bottom flask, equipped with a magnetic stirbar, was charged 9.92 g (165 mmol) of AM-5. Next, 20 g (16.5 mmol) of FC-1 was added to the flask at room temperature over about 1 hour. After stirring for one additional hour, volatiles were removed at temperatures up to 130° C. at 2.5 mm pressure to provide FC-1/AM-5, nominal molecular weight=1239.1 g/mol.

Preparation of HFPOC(=O)NHCH$_2$CH$_2$CH$_2$NH$_2$ (FC-1/AM-7)

To a 50-mL round-bottom flask, equipped with a magnetic stirbar, was charged 6.12 g (82.6 mmol) of AM-7 and 20 g (16.5 mmol) of FC-1 at room temperature. Next the mixture was stirred for about 30 min at room temperature. Finally volatiles were removed at temperatures up to 150° C. at 4.0 mm pressure to provide FC-1/AM-7, nominal molecular weight=1253.1 g/mol.

Preparation of CH$_3$NHCH$_2$CH$_2$CH$_2$NHC(=O)—CF$_2$O (CF$_2$CF$_2$O)$_b$(CF$_2$O)$_c$CF$_2$O—C(=O) NHCH$_2$CH$_2$CH$_2$NHCH$_3$ (FC-2/AM-1)

According to the procedure for preparing FC-1/AM-1, but substituting FC-2 for FC-1, 20 g (20 meq) of FC-2 was combined with 1.76 g (20 meq) of AM-1 and concentrated to provide FC-2/AM-1 nominal molecular weight 2112.3, nominal equivalent weight=1056.15 g/mol.

Preparation of the 1:1 Molar Ratio Adduct of AM-6 with AC-1 (AM-6/AC-1)

To a 100-mL flask equipped with magnetic stirbar was charged 7.51 g (0.1 mol) of AM-6 and 1.8 mg of phenothiazine. Next, 29.61 g (0.1 mol) of AC-1 was added at 23° C. via a pressure-equalizing funnel. The reaction temperature rose to 51° C. and then dropped back to room temperature to provide AM-6/AC-1, nominal molecular weight=371.1 g/mol.

Example 1

This example describes the preparation of an approximately 1:1 molar ratio adduct of FC-1/AM-1 with AC-1 (FC-1/AM-1/AC-1).

A 250-mL round-bottom flask was charged with 4.48 g (15.13 mmol) AC-1, 4.45 g of tetrahydrofuran (THF), and 1.6 mg of phenothiazine, and heated at 55° C. in an oil bath. Next, in a 100-mL jar was dissolved 20 g (15.78 mmol) of FC-1/AM-1 in 32 g of THF. This solution was placed in a 60-mL dropping funnel with pressure equalizing sidearm. The jar was rinsed with ~3 mL of THF which was also added to the dropping funnel, and the contents of the funnel were added over 38 min, under an air atmosphere to the AC-1/THF/phenothiazine mixture. The reaction was cloudy at first, but cleared after about 30 minutes. Twenty minutes after the addition was complete, the reaction flask was placed on a rotary evaporator at 45-55° C. an under 28 inches of Hg vacuum to yield 24.38 g of a clear, viscous yellow liquid, that was characterized by $^1$H and $^{13}$C NMR and HPLC/mass spectroscopy. The resulting material (i.e., FC-1/AM-1/AC-1) had the following approximate molar product distribution as determined by HPLC/mass spectroscopy 20 percent AC-1

40 percent of a monoadduct believed to have the formula 40 percent of diadduct.

Example 2

This example describes the preparation of an approximately 1:1 molar ratio adduct of FC-1/AM-1 with AC-2 (FC-1/AM-1/AC-2).

According to the procedure of Example 1, but substituting AC-2 for AC-1, 20 g (15.78 mmol) of FC-1/AM-1 in about 35 g of THF was added to 4.51 g (15.13 mmol) of AC-2 in about 4.5 g of THF with 1.6 mg of phenothiazine and concentrated to provide FC-1/AM-1/AC-2.

Example 3

This example describes the preparation of an approximately 1:1 molar ratio adduct of FC-1/AM-1 with AC-4 (FC-1/AM-1/AC-4).

According to the procedure of Example 1, but substituting AC-4 for AC-1, 20 g (15.78 mmol of FC-1/AM-1 in about 35 g of THF was added to 6.56 g (15.33 mmol of AC-4 in about 6.8 g of THF with 2.0 mg of phenothiazine and concentrated to provide FC-1/AM-1/AC-4.

Example 4

This example describes the preparation of an approximately 1:1 molar ratio adduct of FC-1/AM-1 AC-5 (FC-1/AM-1/AC-5).

According to the procedure of Example 1, but substituting AC-5 for AC-1, 20 g (15.78 mmol) of FC-1/AM-1 in about 40 g of THF was added to 8.14 g (15.48 mmol) of AC-5 in 8.41 g of THF with 1.6 of phenothiazine and concentrated to provide FC-1/AM-1/AC-5.

Example 5

This example describes the preparation of a 1:3 molar ratio adduct of FC-1/AM-1 with AC-6 (FC-1/AM-1/AC-6).

According to the procedure of Example 1, but substituting AC-6 for AC-1, 5.00 g (3.95 mmol) of FC-1/AM-1 in about 15 g THF was added to 2.35 g (11.84 mmol) of AC-6 in 2.5 g THF with 0.3 mg of phenothiazine to provide, upon concentration, FC-1/AM-1/AC-6.

Example 6

This example describes the preparation of an approximately 1:1 molar ratio adduct of FC-1/AM-2 with AC-1 (FC-1/AM-2/AC-1).

According to the procedure of Example 1, but substituting AM-2 for AM-1, 20 g (15.78 mmol) of FC-1/AM-2 in about 35 THF was added to 4.48 g (15.14 mmol) of AC-1 in 4.5 g of THF with 1.6 mg of phenothiazine to provide FC-1/AM-2/AC-1 upon concentration.

Example 7

This example describes the preparation of a 1:1 molar ratio adduct of FC-1/AM-2 with AC-3 (FC-1/AM-2/AC-3).

According to the procedure of Example 7, but substituting AC-3 for AC-1, 19.5 g (15.4 mmol) of FC-1/AM-2 in about 35 g of THF was added to 7.81 g (15.4 mmol) of AC-3 in 8 g of THF with 2.1 mg of phenothiazine to provide upon concentration FC-1/AM-2/AC-3.

Example 8

This example describes the preparation of an approximately 1:1 molar ratio adduct of FC-1/AM-2 with AC-4 (FC-1/AM-2/AC-4).

According to the procedure of Example 7, but substituting AC-4 for AC-1, 20 g (15.78 mmol) of FC-1/AM-2 in about 35 g of THF was added to 6.56 g (15.33 mmol) of AC-4 in 6.6 g of THF with 1.2 mg of phenothiazine to provide FC-1/AM-2/AC-4 upon concentration.

Example 9

This example describes the preparation of an approximately 1:1 molar ratio adduct of FC-1/AM-2 with AC-5 (FC-1/AM-2/AC-5).

According to the procedure of Example 7, but substituting AC-5 for AC-1, 20 g (15.78 mmol) of FC-1/AM-2 in about 35 g of THF was added to 8.14 g (15.48 mmol) of AC-5 in 8.2 g of THF with 1.2 mg of phenothiazine to provide FC-1/AM-2/AC-5 upon concentration.

Example 10

This example describes the preparation of an approximately 1:1 molar ratio adduct of FC-1/AM-3 with AC-1 (FC-1/AM-3/AC-1).

According to the procedure of Example 1, but substituting AM-3 for AM-1, 20 g (15.6 mmol) of FC-1/AM-3 was reacted with 4.43 g (14.97 mmol) of AC-1 to yield 24.37 g of a product (FC-1/AM-3/AC-1) which, on a mole basis, was about two-thirds of an amine monoadduct and about one-third of a material believed to be a hydroxy monoadduct of the above compound and AC-1.

Example 11

This example describes the preparation of an approximately 1:1 molar ratio adduct of FC-1/AM-3 with AC-2 (FC-1/AM-3/AC-2).

According to the procedure of Example 10, but substituting AC-2 for AC-1, 20 g (15.6 mmol) of FC-1/AM-3 in about 35 g of THF was added to 4.46 g (14.97 mmol) of AC-2 in 4.4 g THF with 1.8 mg of phenothiazine to provide FC-1/AM-3/AC-2 upon concentration.

Example 12

This example describes the preparation of an approximately 1:1 molar ratio adduct of FC-1/AM-3 with AC-4 (FC-1/AM-3/AC-3).

According to the procedure of Example 10, but substituting AC-3 for AC-1, 20 g (15.59 mmol) of FC-1/AM-3 in about 35 g of THF was added to 6.48 g (15.14 mmol) of AC-4 in 6.5 g of THF to provide upon concentration FC-1/AM-3/AC-4.

Example 13

This example describes the preparation of an approximately 1:4 molar ratio (1:1 equivalent) adduct of FC-1/AM-4 with AC-1 (FC-1/AM-4/AC-1).

According to the procedure of Example 1, but substituting AM-4 for AM-1, 20 g (30.88 meq) FC-1/AM-4 in about 40 g of THF was added to 8.77 g (29.62 meq) of AC-1 in 8.8 g of THF with 1.6 mg of phenothiazine to provide FC-1/AM-4/AC-1 upon concentration.

Example 14

This example describes the preparation of an approximately 1:2 molar ratio of FC1/AM-5 with AC-1 (FC-1/AM-5/AC-1).

According to the procedure of Example 1, but substituting AM-5 for AM-1, 5.0 g (4.04 mmol) of FC-1/AM-5 in 9.9 g of THF and 10.1 g of FS was added to 2.39 g (8.07 mmol) of AC-1 in 5.6 g THF and 5.8 g of FS with 0.4 mg of phenothiazine to provide FC-1/AM-5/AC-1 upon concentration.

Example 15

This example describes the preparation of a 1:2 molar ratio of FC-1/AM-7 with AC-1 (FC-1/AM-7/AC-1).

According to the procedure of Example 1, but substituting AM-7 for AM-1, 5.0 g (3.99 mmol) of FC-1/AM-7 in 6 g of THF and 6 g of FS was added to 2.36 g (7.98 mmol) of AC-1 in 6 g of THF and 6 g of FS with 0.4 mg of phenothiazine to provide FC-1/AM-7/AC-1 upon concentration.

Example 16

This example describes the preparation of an approximately 1:2 molar ratio (1:1 equivalent) adduct of FC-2/AM-1 with AC-1 (FC-2/AM-1/AC-1).

According to the procedure of Example 1, but substituting FC-2 for FC-1, 10 g (9.47 meq) of FC-2/AM-1 in about 25 g of THF was added to 2.80 g (9.46 meq) of AC-1 in 3 g of THF with 0.6 mg of phenothiazine to provide FC-2/AM-1/AC-1 upon concentration.

Example 17

This example describes the preparation of a 1:1 molar ratio adduct of FC-3 and AM-6/AC-1 (FC-3/AM-6/AC-1).

To a 100-mL flask equipped with magnetic stirbar was charged 3.32 g (8.97 mmol) of AM-6/AC-1, 1.17 g (8.97 mmol) of N,N-diisopropyl-N-ethylamine, 0.7 mg of phenothiazine, 7.25 g of ethyl acetate and 8.21 g of FS and heated to 40° C. was charged a mixture of 10.0 g (8.97 mmol) of FC-3, 18.62 g of FS and 17.92 g of ethyl acetate from a pressure equalizing funnel over 30 min. After stirring overnight, the reaction was washed twice with an equal volume of deionized water, dried over anhydrous magnesium sulfate, filtered and concentrated by rotary evaporation.

Examples 18a-38b and Comparative Examples Aa-Ab

Substrates were coated with polymerizable compositions using materials and amounts as reported in Table 1. All polymerizable components were diluted to 10 percent by weight total solids. Either 2 percent by weight of photoinitiators PI-1, or 1 percent by weight PI-2, was included in the polymerizable compositions using a 10 percent solids photoinitiator solutions in methyl ethyl ketone. The photoinitiator was added before dilution to the final percent by weight total solids. Dilution to the final percent by weight total solids was achieved using methyl isobutyl ketone for formulations containing PI-1, or methyl ethyl ketone for formulations containing PI-2. Each coating solution was coated onto the coating substrate using Coating Method 1 or Coating Method 2 described below.

TABLE 1

| Example | Diluted Weight Percent Solids | AC-1, Weight Percent | Michael-Type Adduct and Weight Percent | Additional Fluorinated acrylate, Weight Percent | Coating Method | Substrate | Nominal Cured Dry Thickness, nanometers |
|---|---|---|---|---|---|---|---|
|  |  |  | FC-1/AM-1/AC-1 | FC-4 |  |  |  |
| 18a | 2.0 | 85 | 10 | 5 | 1 | S1 | 40 |
| 18b | 2.0 | 85 | 10 | 5 | 1 | S2 | 50 |
| 19a | 2.0 | 85 | 15 | 0 | 1 | S1 | 40 |
| 19b | 2.0 | 85 | 15 | 0 | 1 | S2 | 40 |
| 20a | 2.5 | 85 | 10 | 5 | 1 | S1 | 60 |
| 20b | 2.5 | 85 | 10 | 5 | 1 | S2 | 60 |
| 21a | 2.5 | 85 | 15 | 0 | 1 | S1 | 60 |
| 21b | 2.5 | 85 | 15 | 0 | 1 | S2 | 60 |
| 22a | 2.5 | 90 | 10 | 0 | 1 | S1 | 60 |
| 22b | 2.5 | 90 | 10 | 0 | 1 | S2 | 60 |
| 23a | 2.5 | 95 | 5 | 0 | 1 | S1 | 60 |
| 23b | 2.5 | 95 | 5 | 0 | 1 | S2 | 60 |
| 24a | 2.0 | 95 | 5 | 0 | 1 | S1 | 60 |
| 24b | 2.0 | 95 | 5 | 0 | 1 | S2 | 60 |
| 25a | 2.0 | 97.5 | 2.5 | 0 | 1 | S1 | 60 |
| 25b | 2.0 | 97.5 | 2.5 | 0 | 1 | S2 | 60 |
| 26a | 2.0 | 98.75 | 1.25 | 0 | 1 | S1 | 60 |
| 26b | 2.0 | 98.75 | 1.25 | 0 | 1 | S2 | 60 |
| 27a | 2.0 | 99.9375 | 0.625 | 0 | 1 | S1 | 60 |
| 27b | 2.0 | 99.9375 | 0.625 | 0 | 1 | S2 | 60 |
|  |  |  | FC-1/AM-1/AC-2 | FC-4 |  |  |  |
| 28a | 2.0 | 95 | 5 | 0 | 1 | S1 | 60 |
| 28b | 2.0 | 95 | 5 | 0 | 1 | S2 | 60 |
|  |  |  | FC-1/AM-1/AC-4 | FC-4 |  |  |  |
| 29a | 2.0 | 95 | 5 | 0 | 1 | S1 | 60 |
| 29b | 2.0 | 95 | 5 | 0 | 1 | S2 | 60 |
|  |  |  | FC-1/AM-2/AC-1 | FC-4 |  |  |  |
| 30a | 2.0 | 95 | 5 | 0 | 1 | S1 | 60 |
| 30b | 2.0 | 95 | 5 | 0 | 1 | S2 | 60 |
|  |  |  | FC-1/AM-2/AC-4 | FC-4 |  |  |  |
| 31a | 2.0 | 95 | 5 | 0 | 1 | S1 | 60 |
| 31b | 2.0 | 95 | 5 | 0 | 1 | S2 | 60 |
|  |  |  | FC-1/AM-1/AC-1 | FC-4 |  |  |  |
| 32a | 3.0 | 20 | 10 | 70 | 2 | S1 | 1300 nm wet thickness before solvent removal |

TABLE 1-continued

| Example | Diluted Weight Percent Solids | AC-1, Weight Percent | Michael-Type Adduct and Weight Percent | Additional Fluorinated acrylate, Weight Percent | Coating Method | Substrate | Nominal Cured Dry Thickness, nanometers |
|---|---|---|---|---|---|---|---|
| 33a | 3.0 | 30 | 10 | 60 | 2 | S1 | 1300 nm wet thickness before solvent removal |
| 34a | 3.0 | 50 | 10 | 40 | 2 | S1 | 1300 nm wet thickness before solvent removal |
| 35a | 3.0 | 60 | 20 | 20 | 2 | S1 | 1300 nm wet thickness before solvent removal |
| 36 | 2 | 20 | 10 | 70 | 1 | S2 | 60 |
| 37 | 2 | 20 | 70 FC-1/AM-1/AC-1 | 10 FC-5 | 1 | S2 | 60 |
| 38a | 2.5 | 85 | 10 | 5 | 1 | S1 | 60 |
| 38b | 2.5 | 85 | 10 | 5 | 1 | S2 | 60 |
| Comparative Example Aa | 2.5 | 100 | 0 | 0 | 1 | S1 | 60 |
| Comparative Example Ab | 2.5 | 100 | 0 | 0 | 1 | S2 | 60 |

The coatings were evaluated using the Contact Angle Measurement Procedure to determine contact angles (static, advancing, and receding) with water and advancing and receding with hexadecane. The results of these analyses are reported in Table 2 (below).

TABLE 2

| | Contact Angle with Water | | | Contact Angle with Hexadecane | | |
|---|---|---|---|---|---|---|
| Example | Static | Advancing | Receding | Advancing | Receding | Static |
| 18a | 108 | 119 | 87 | 69 | 62 | NM |
| 18b | 109 | 121 | 88 | 69 | 60 | NM |
| 19a | 104 | 15 | 76 | 66 | 56 | NM |
| 19b | 106 | 119 | 80 | 67 | 57 | NM |
| 20a | 106 | 118 | 82 | 68 | 57 | NM |
| 21a | 103 | 115 | 73 | 65 | 52 | NM |
| 22a | 103 | 115 | 75 | 64 | 54 | NM |
| 23a | 88 | 101 | 55 | 47 | 39 | NM |
| 24a | 81 | 96 | 43 | 51 | 34 | NM |
| 25a | 77 | 92 | 41 | 42 | 28 | NM |
| 26a | 67 | 83 | 36 | 33 | NM | NM |
| 27a | 64 | 80 | 33 | 29 | NM | NM |
| 28a | 79 | 94 | 43 | 44 | 30 | NM |
| 29a | 79 | 90 | 39 | 52 | 31 | NM |
| 30a | 89 | 98 | 49 | 53 | 39 | NM |
| 31a | 77 | 94 | 40 | 42 | 27 | NM |
| 32a | 97 | NM | NM | NM | NM | 75 |
| 33a | 100 | NM | NM | NM | NM | 74 |
| 34a | 99 | NM | NM | NM | NM | 73 |
| 35a | 101 | NM | NM | NM | NM | 78 |
| 36 | 110 | 123 | 91 | 72 | 62 | NM |
| 37 | 110 | 119 | 75 | 71 | 61 | NM |
| 38a | 102 | 115 | 74 | 63 | 53 | NM |
| Comparative Example Aa | 59 | 76 | 47 | 18 | NM | NM |

A number of the coated matte films at a nominal coating thickness of 60 nm were subjected to Cheesecloth durability testing for up to 500 rubs. The results are reported in Table 3 (below), wherein "Y" means Yes and "N" means No.

TABLE 3

| | | | Cheese Cloth Abrasion Resistance Test Results | | | |
|---|---|---|---|---|---|---|
| | | | Before Cheesecloth Wipes | | After Cheesecloth Wipes | |
| Example | Weight applied to Stylus, grams | Number of Wipes | Ink Repellency, Yes/No | Ink Beads Up, Yes/No | Ink Repellency, Yes/No | Ink Beads Up, Yes/No |
| 20b | 725 | 200 | Y | Y | Y | Y |
| 21b | 725 | 200 | Y | Y | Y | Y |
| 22b | 725 | 200 | Y | Y | Y | Y |
| 23b | 725 | 200 | Y | Y | Y | Y |
| Comparative Example Ab | 725 | 200 | N | N | N | N |
| 24b | 1000 | 500 | Y | Y | Y | Y |
| 25b | 1000 | 500 | Y | Y | Y | Y |
| 26b | 1000 | 100 | Y | Y | Y | Y |
| 27b | 1000 | 500 | N | N | N | N |
| 28b | 1000 | 200 | Y | Y | Y | Y |
| 29b | 1000 | 200 | Y | Y | Y | Y |
| 30b | 1000 | 500 | Y | Y | Y | Y |
| 31b | 1000 | 200 | Y | Y | Y | Y |
| 38b | 725 | 150 | Y | Y | Y | Y |

Various modifications and alterations of this invention may be made by those skilled in the art without departing from the scope and spirit of this invention, and it should be understood that this invention is not to be unduly limited to the illustrative embodiments set forth herein.

What is claimed is:

1. A method of making a polymerizable composition comprising combining:
 a reactive fluorinated polyether; and
 a poly(meth)acryl compound
under conditions sufficient to form a Michael-type adduct thereof, wherein the Michael-type adduct has at least one (meth)acryl group, wherein the reactive fluorinated polyether is described by the formula $$F(R_fO)_xQZ^1R^1NR^2H$$

or $$X(R_fO)_xQZ^1R^1NR^2H$$

wherein
- each $R_f$ independently represents a fluorinated alkylene group having from 1 to 6 carbon atoms;
- each x independently represents an integer greater than or equal to 2;
- each Q independently represents —$CF_2$—, —$CF(CF_3)$—, —$CF_2CF_2$—, —$CF_2CF_2CF_2$—, —$CF_2CF(CF_3)$—, —$CF(CF_3)CF_2$—, —$CF_2CF_2CH_2$—, —$CF_2CH_2$—, —$CF_2CF_2C(=O)$—, —$CF_2C(=O)$—, —$CF(CF_3)C(=O)$—, —$CF(CF_3)CH_2$—, an alkylene group having from 1 to 6 carbon atoms, or a heteroalkylene group having from 1 to 6 carbon atoms;
- $Z^1$ represents —S—, —O—, —NH—, or —$NR^2$—;
- $R^1$ represents an alkylene, aralkylene, or heteroalkylene group;
- $R^2$ independently represents H or alkyl having from 1 to 6 carbon atoms; and
- X represents a polyvalent organic group.

2. A method according to claim 1, wherein $R^1$ has from 1 to 6 carbon atoms.

3. A method according to claim 1, wherein x is greater than or equal to 3.

4. A method according to claim 1, wherein $Z^1$ represents —$NR^2$—.

5. A method according to claim 1, wherein $Z^1$ represents —NH—.

6. A method according to claim 1, further comprising combining the Michael-type adduct and at least one additional polymerizable monomer.

7. A method according to claim 6, further comprising at least partially polymerizing the combination of the Michael-type adduct and at least one additional polymerizable monomer.

8. A method according to claim 6, further comprising applying the combination of Michael-type adduct and at least one additional polymerizable monomer to a substrate.

9. A method according to claim 8, further comprising at least partially polymerizing the combination of the Michael-type adduct and at least one additional polymerizable monomer to provide a polymerized mixture.

10. A method according to claim 1, further comprising combining the Michael-type adduct, at least one additional polymerizable monomer, and at least one free-radical photoiniator.

11. A method according to claim 10, further comprising at least partially polymerizing the combination of the Michael-type adduct and at least one additional polymerizable monomer.

12. A method according to claim 10, further comprising applying the at least partially polymerized combination of the Michael-type adduct and at least one polymerizable additional monomer to a substrate.

13. A method according to claim 12, further comprising at least partially polymerizing the polymerizable additional monomer.

* * * * *

UNITED STATES PATENT AND TRADEMARK OFFICE
CERTIFICATE OF CORRECTION

PATENT NO. : 7,342,080 B2
APPLICATION NO. : 11/009181
DATED : March 11, 2008
INVENTOR(S) : Zai-Ming Qiu It is certified that error appears in the above-identified patent and that said Letters Patent is hereby corrected as shown below:

Page 2
On the Title Page Item (56), U.S. Patent Documents, delete "6,664,345" and insert -- 6,664,354 -- in place thereof.
On the Title Page Item (56), Other Publications, delete "Polymerization" and insert -- Polymerizable -- in place thereof.

Column 1
Line 38, delete "$(F(R_fO)_xQZ^1R^1N^2CH_2CH_2C$" and insert
-- $(F(R_fO)_xQZ^1R^1NR^2CH_2CH_2C$ -- in place thereof.

Column 2
Line 23, insert -- out, and may be used to prepare a wide range of polymerizable compounds having -- following "carry".

Column 5
Line 39, delete "—$CF_2CF(CF_3)$-" and insert -- —$CF_2CF(CF_3)$— -- in place thereof.

Column 6
Lines 14-15, delete "[[2,2,6,6-tetrakis(ylomethyl)-4-oxaheptan-1,7-diyl]]; butan-1,3-diyl; hexan-1,6-diyl [[hexane-1,6-diyl ]];" and insert -- butan-1,3-diyl; hexan-1,6-diyl; -- in place thereof.

Column 7
Lines 64-65, delete "$C_4F_9SO_2N(CH_3)CH_2CH_2C$" and insert
-- $C_4F_9SO_2N(CH_3)CH_2CH_2OC$ -- in place thereof.

Column 8
Line 43, delete "2,2-azobis" and insert -- 2,2'-azobis -- in place thereof.

Column 13
Line 38, insert -- geometry with a diameter of 1.25 inch (3.2 cm). The device was equipped with a platform -- following "cylindrical".

UNITED STATES PATENT AND TRADEMARK OFFICE
CERTIFICATE OF CORRECTION

PATENT NO. : 7,342,080 B2
APPLICATION NO. : 11/009181
DATED : March 11, 2008
INVENTOR(S) : Zai-Ming Qiu

It is certified that error appears in the above-identified patent and that said Letters Patent is hereby corrected as shown below:

<u>Column 17</u>
Line 42, delete "AC-1,20" and insert -- AC-1, 20 -- in place thereof.

<u>Column 24</u>
Line 10, Claim 8, insert -- the -- following "combination of"
Lines 19-20, Claim 10, delete "photoiniator" and insert -- photoinitiator -- in place thereof.

Signed and Sealed this

Ninth Day of September, 2008

JON W. DUDAS
*Director of the United States Patent and Trademark Office*